United States Patent [19]

Albers et al.

[11] 4,049,602
[45] Sept. 20, 1977

[54] WHITE NON-PIGMENTED HOT MELT POLYOLEFIN ADHESIVES

[75] Inventors: Kenneth H. Albers; Robert E. Holliday, both of Longview, Tex.

[73] Assignee: Eastman Kodak Company, Rochester, N.Y.

[21] Appl. No.: 658,326

[22] Filed: Feb. 17, 1976

[51] Int. Cl.² .................. C08L 51/06; C08L 93/00
[52] U.S. Cl. ...................... 260/27 R; 260/876 R; 260/878 R
[58] Field of Search .............. 252/51.5 R; 260/27, 260/878 B, 27 R, 878 R, 876 R

[56] References Cited

U.S. PATENT DOCUMENTS

| 3,177,270 | 4/1965 | Jones et al. | 260/876 R |
| 3,313,754 | 4/1967 | Logan | 260/27 R |
| 3,492,372 | 1/1970 | Flanagan | 260/27 R |
| 3,632,673 | 1/1972 | Heilman | 260/876 R |
| 3,679,775 | 7/1972 | Hagemeyer et al. | 260/878 B |
| T900,016 | 7/1972 | Dickert et al. | 260/876 R |

FOREIGN PATENT DOCUMENTS

| 553,779 | 6/1957 | Belgium | 260/878 |

Primary Examiner—Melvyn I. Marquis
Assistant Examiner—H. H. Fletcher
Attorney, Agent, or Firm—Clyde L. Tootle; Daniel B. Reece, III

[57] ABSTRACT

Hot melt polyolefin adhesives are provided having white color. These adhesives contain a white, non-pigmented polymeric composition prepared by polymerizing styrene in the presence of an amorphous polyalphaolefin.

11 Claims, No Drawings

WHITE NON-PIGMENTED HOT MELT POLYOLEFIN ADHESIVES

This invention relates to novel hot melt adhesive compositions having improved color. More specifically, this invention relates to white hot melt adhesive compositions containing a white, non-pigmented styrenated amorphous polyolefin.

Hot melt adhesives based on amorphous polyolefins are widely used in industry for various applications. Although these adhesives are satisfactory for many applications, their color, which has been described as a stale urine color, prevents their full utilization in certain applications. For example, in certain consumer products such as disposable diapers the color of the hot melt adhesives presently used is aesthetically displeasing.

Various methods have been tried in an attempt to improve the color of these adhesives. These methods include, for example, the addition of vinyl toluene-alpha-methyl styrene copolymers or white pigments such as titanium dioxide to the hot melt adhesive compositions. However, these methods have not provided satisfactory. The vinyl toluene-alpha-methyl styrene copolymers at levels sufficient to improve the color of the adhesive become incompatible and adversely affect the adhesive properties. The white pigments tend to settle out of the adhesive in the molten state and also cause plugging of the nozzles on application equipment. Therefore, to provide an amorphous polyolefin based hot melt adhesive composition having an unpigmented white color would be an advance in the state of the art.

It is, therefore, an object of the present invention to provide a novel white polyolefin containing adhesive composition.

Another object of this invention is to provide a modified amorphous polyolefin composition having a non-pigmented white color.

A still further object of the invention is to provide white hot melt adhesive containing a polymerized white styrene polyolefin composition.

Further objects and advantages of the invention will be apparent to those skilled in the art from the accompanying disclosure.

In accordance with the present invention, we have discovered that blends comprised of a white, non-pigmented styrenated amorphous polyolefin and a tackifying resin and blends comprised of a styrenated amorphous polyolefin, a tackifying resin, and an amorphous polyolefin provide hot melt adhesive compositions having a white color and a novel combination of properties including good adhesive properties.

The styrenated amorphous polyolefins useful in the compositions of this invention are white polymeric compositions prepared by polymerizing styrene in the presence of amorphous polyolefins. These styrenated amorphous polyolefins have a styrene content of about 1 to about 90 percent by weight, preferably about 5 to about 60 percent by weight. These styrenated amorphous polyolefins have a melt viscosity at 190° C. of about100 to about 50,000 centipoise or higher.

The amorphous polyolefins useful in the adhesive compositions of this invention are amorphous polypropylene and amorphous propylene-alpha-monoolefin copolymers or mixtures of these polymers.

The amorphous polyolefins useful in the compositions of this invention are essentially noncrystalline hexane soluble polyolefins having a melt viscosity at 190° C. of about 100 to about 500,000 centipoise or higher. The preferred amorphous polyolefins to be used in hot melt adhesive applications are solid amorphous polyolefins having a melt viscosity of about 1,000 to about 3,000 centipoise.

One preferred amorphous polypropylene is that obtained in the solution polymerization of propylene in the presence of stereospecific catalysts such as disclosed in U.S. Pat. No. 3,679,775. For example, propylene is polymerized at a temperature of about 150° C. and a pressure of about 1000 psig. with a catalyst such as lithium butyl-aluminum triethyl-titanium trichloride in a molar ratio of 0.5/0.5/1.0. The polymerization is conducted in the presence of a diluent such as mineral spirits which is a solvent for the polymer at the reaction temperature. The solvent solution produced which contains crystalline polymer and amorphous polymer is concentrated to form a solid crystalline and amorphous polymer concentrate which is then formed into pellets. These pellets are then extracted with a solvent such as hexane to obtain a hexane soluble amorphous polypropylene.

The hexane soluble amorphous propylene-alpha-monoolefin copolymers useful in the composition of this invention are formed in varying amounts during the production of crystalline propylene-alpha-monoolefin copolymers by stereospecific polymerization of propylene and a different alpha-monoolefin by a process such as disclosed in U.S. Pat. No. 3,529,037. Some of these amorphous copolymers can also be produced directly, i.e., without production of crystalline copolymer by stereospecific polymerization under appropriate process conditions. One example of amorphous copolymers useful in the present invention is amorphous propylene butene copolymers containing from about 30 percent to about 75 weight percent butene-1. These copolymers and methods for their preparation are disclosed in U.S. Pat. No. 3,923,758.

In preparing the white styrenated polymeric compositions used in preparing the adhesive of our invention, styrene is polymerized in the presence of an amorphous polyolefin, for example, amorphous polypropylene. The polymerization reaction is normally carried out in the melt phase by mixing the amorphous polyolefin, styrene, and catalyst, if desired, in a well agitated vessel. If desired, the reaction can be carried out in solution by using an inert diluent which is a solvent for the amorphous polyolefin; however, the melt phase is preferred. The temperature of the reaction can range from about 50° C. to about 300+ C. with the preferred range being from about the softening point of the amorphous polyolefin to about 300° C. The reaction is usually carried out at atmospheric pressure, however, higher pressures can be used if desired. The styrene and catalyst can be added to the reaction mixture all at once or in small portions over a period of time.

The white styrenated amorphous polyolefin can be prepared by polymerizing styrene with the amorphous polyolefin in the presence of absence of a catalyst. However, the use of a catalyst is preferred to increase the reaction rate of the styrene polymerization. The amount of catalyst used can vary from none up to about 25 weight percent based on the weight of the styrene. Greater amounts of catalyst can be used, however, such greater amounts tend to degrade the product without increasing the styrene content or speed of polymerization. Moreover, the temperature at which the styrene can be polymerized is from the softening point temperature of the amorphous polyolefin up to about 300° C. to obtain a styrenated amorphous polyolefin containing from 1 to 90 weight percent styrene. The white styrenated amorphous polyolefin can be obtained by polymerizing the styrene without catalyst over the above noted temperature range. The white styrenated amorphous polyolefin can also be obtained by using di-t-butyl peroxide as the catalyst in an amount of from about 2 to 25 weight percent based on the weight of styrene and at polymerization temperatures lower than 160° C. or at temperatures greater than 210° C.

The catalysts useful in the reaction are the free radical type with peroxides being preferred. Examples of such catalysts are cumene hydroperoxide and di-tertiary-butyl peroxide.

After the reaction is completed, unreacted styrene and volatile products of the reaction can be removed by stripping with an inert gas such as nitrogen or by vacuum stripping.

The white styrenated amorphous polyolefin can be used alone with the tackifier resin or blended with an amount of unstyrenated amorphous polyolefin. For example, the amorphous polyolefin or blend of such polyolefins can be used in amounts of about 5 percent to about 85 percent by weight of the adhesive composition, preferably about 10 percent to about 80 percent by weight, and most preferably about 30 percent to about 70 percent by weight.

When the styrenated amorphous polyolefin and the amorphous polyolefin are used together, the combination of the two materials is preferably used in an amount of about 50 percent to about 90 percent by weight of the adhesive composition and most preferably about 60 percent to about 80 percent by weight.

The tackifying resins useful in the composition of this invention can be a hydrocarbon resin such as DAC-B (debutanized aromatic concentrate - bottoms) hydrocarbon resin prepared according to the process disclosed in U.S. Pat. No. 3,701,760 as well as other hydrocarbon resins, polyterpenes or terpene polymers, rosin esters, blends of such resins, and the like. One such hydrocarbon tackifying resin is a hydrocarbon resin having a softening point of 130° C. and available commercially as "Resin H-130" from Eastman Chemical Products, Inc. Other hydrocarbon tackifying resins can be prepared by the polymerization of monomers consisting primarily of olefins and diolefins and include, for example, the residual by-product monomers resulting from the manufacture of isoprene. These hydrocarbon tackifying resins typically exhibit a ring and ball softening point of from about 5° C. to 125° C.; and acid number of from 0 to 2; and an iodine value of from about 75 to 125. Examples of such commercially available resins of this type are "Wingtack" 10 and "Wingtack" 95 as sold by the Goodyear Tire and Rubber Company and the Sta-Tac and Betaprene 14 resins sold by the Reichhold Chemical Corporation.

Also suitable tackifying resins are the polyterpenes or terpene polymers such as the polymeric, resinous materials including the dimers as well as higher polymers obtained by polymerization and/or copolymerization of terpene hydrocarbons such as the alicyclic, monocyclic, and bicyclic monoterpenes and their mixtures, including allo-ocimene, carene, isomerized pinene, pinene, dipentene, tepinene, terpinolen, limonene, turpentine, and terpene cut or fraction, and various other terpenes. Particularly useful materials for preparing the tackifying materials are terpene mixtures containing at least 20 percent beta-pinene and/or limonene or dipentene (racemic limonene), and the "sulfate turpentine" obtained as a by-product in the sulfate pulping process. Other suitable tackifying resins are the rosin esters which include ethylene glycol, polyethylene glycol, glycerol and pentaerythritol rosin esters, hydrogenated rosin esters or methylated rosin esters, for example, the commercially available materials "Staybelite" Ester 3 triethylene glycol ester of hydrogenated rosin, "Foral" 85 and 105 highly stabilized ester resins of pentaerythritol and rosin base.

The tackifying resins, such as hydrocarbon resins, polyterpenes, and rosin esters, can be used either alone or in mixtures of such resins. The tackifying resin portion of the adhesive is an amount of about 10 percent to about 50 percent by weight of the adhesive composition, preferably about 10 percent to about 30 percent by weight.

In addition to the above components, it is desirable for the adhesive compositions to contain about 0.1 percent to about 1.5 percent by weight, preferably about 0.25 percent to 1.0 percent by weight, of one or more antioxidants. Antioxidants that are known to be effective for the various components especially the amorphous polyolefin can be used. Such antioxidants include for example "Ionox" 200 and 330 [tris(di-t-butyl-p-hydroxybenzyl)-trimethylbenzene], "Dalpac"4C2 [6-di(t-butyl)-p-cresol], "Naugawhite" (alkylated bisphenol), "Butyl Zimate" (zinc dibutyl dithiocarbamate), "Irganox" 1010 [pentaerythritol tetrakis(3-3,5-di-t-butyl-4-hydroxyphenyl propionate)], and "Plastanox" 1212 ([lauryl stearyl thiodipropionate]. An ultraviolet radiation absorber such as Tinuvin P [2-(2'-hydroxy-5-methylphenyl)benzotriazole] may also be added, if desired.

The adhesive compositions of this invention are prepared by blending together the components in the melt at a temperature of about 160° C. to about 220° C. in an inert atmosphere such as nitrogen until a homogeneous mixture is obtained. Various methods of blending materials of this type are known to the art and any method that produces a homogeneous mixture is satisfactory. These components blend easily in the melt and a heated vessel equipped with a stirrer is all that is required. For example, a Cowles stirrer provides effective mixing for preparing these compositions.

It should be noted that blends of amorphous polypropylene with polystyrene and blends of amorphous polypropylene with polystyrene and tackifying resins are incompatible. The polystyrene separated from the other compounds(s) of the blend in small sand-like particles and does not provide a white color to the blend. Therefore, it was quite surprising when it was discovered that styrenated amorphous polypropylene was compatible in all proportions with amorphous polypropylene and/or tackifying resins and could be used to prepare hot melt adhesive compositions that were white and had good adhesive properties.

This invention will be further illustrated by the following examples although it will be understood that these examples are included merely for purposes of illustration and are not intended to limit the scope of the invention.

EXAMPLE 1

This example illustrates one process for the synthesis of styrenated polyolefin compositions used in preparing the adhesives of this invention. A 4-liter resin flask was fitted with an anchor blade stirrer, a water cooled condenser, a nitrogen gas purge system, a 1,000 milliliter pressure compensating addition funnel, a thermocouple inside an 8-inch tube and a thermometer between the resin flask and mantle which was attached to a Thermo-watch temperature controller. The flask was charged with 900 grams of amorphous polypropylene (Thermosel viscosity = 1750 centipoise at 190° C., Gardner color = 3) which was heated with stirring to 200° C. The addition funnel was charged with 800 grams of styrene and 8 milliliters of cumene hydroperoxide.

The styrene and cumene hydroperoxide mixture was added dropwise during 2 hours at 200° C. and the reaction mixture was stirred an additional hour at 200° C. A fast nitrogen gas purge was then used to strip low boiling compounds from the product. After stripping, the product was poured into silicone paper trays. The product, a white solid, had a Thermosel viscosity at 190° C, of 27,500 centipoise and a styrene content (by nuclear magnetic reasonance analysis) of 48 percent.

EXAMPLE 2

This example illustrates an adhesive composition of this invention. A hot melt adhesive was made in a 400 milliliter beaker fitted with a stirrer under a nitrogen gas purge using the following components:

---

50.00 grams amorphous polypropylene (Thermosel viscosity = 1675 centipoise at 190° C.)
29.55 grams Hydrocarbon Resin[1]
20.00 grams styrenated amorphous polypropylene prepared according to Example 1 (54 percent styrene, RBSP = 114° C., Thermosel viscosity = 13,000 centipoise at 190° C.)
0.35 grams Antioxidant[2]
0.10 gram Antioxidant[3]

[1]hydrocarbon resin having a softening point of 130° C. available commercially as Resin H-130 or resin having a softening point of 130° C. prepared according to the process disclosed in U.S. Patent 3,701,760.
[2]tetrakis[methylene(3,5-di-tert-butyl-4-hydroxyhydrocinnanate)methane.
[3]lauryl stearyl thiodipropionate.

---

The beaker was heated with an electric heating mantle to a temperature of 200° C. with stirring for 1 hour. The white adhesive was then poured into a silicone lined box and allowed to cool. The Thermosel viscosity of the product was 2400 centipoise at 350° F.

The adhesive was evaluated by the following procedure using a 1 mil thick polyethylene film as the substrate.

The adhesive is heated to about 230° F. 260° F. and applied as a ⅛-inch bead to the polyethylene film (4 inches by 12 inches). A second piece of polyethylene film is immediately placed on the adhesive bead with moderate pressure as necessary to form a bond. The specimen is then aged for 24 hours at 73° F. The specimen is then cut perpendicular to the adhesive bead to divide it into test specimens of 2-1 inch by 4 inch strips joined by a ¼ inch by 1 inch strip of adhesive. A test specimen is placed in a tensile tester and the bond is peeled apart at a rate of 10 inches per minute. The force, in grams, necessary to separate the adhesive bend or to tear the polyethylene film is averaged over four specimens.

The film failed at 1250 grams peel strength. Samples of polyethylene film bonded by the above adhesive were tested after being subjected to a 200° F. sterilization process and an immersion in 100° F. waer. Again the film failed before the adhesive bond.

EXAMPLE 3

A hot melt adhesive was prepared as described in Example 2 using the following ingredients.

70.00 grams styrenated amorphous polypropylene (15 percent styrene, RBSP = 109° C., thermosel viscosity = 3275 centipoise at 190° C.)
29.55 grams Hydrocarbon Resin[1]
0.35 gram Antioxidant[2]
0.10 gram Antioxidant[3]

The product had a Thermosel viscosity of 2400 centipoise at 190° C. and was white in color. Testing of the adhesive as described in Example 1 on 30-pound Kraft paper, machine-glazed on one side gave a paper to paper bond strength of 1260 grams

EXAMPLE 4

Several hot melt adhesives were prepared according to the procedure of Example 2. the composition and properties of the adhesives are shown in Table I. As can be seen, the adhesives of this invention have at least equivalent properties to the prior art (control) adhesives and have a white color as compared with the yellow color of the prior art adhesives.

Table I

Properties of Adhesives Based on Styrenated-Amorphous Polypropylene Compared with Prior Art Adhesives

| | Run 1 | Run 2 Control | Run 3 | Run 4 Control | 17-1 Control | 17-2 | 17-3 | 17-5 |
|---|---|---|---|---|---|---|---|---|
| Composition, Wt. % | | | | | | | | |
| Amorphous Polypropylene | — | 99.8 | — | 69.55 | — | — | — | — |
| Amorphous Polypropylene | — | — | — | — | 69.5 | 67.0 | 57.0 | 50.0 |
| Styrenated Amorphous Polypropylene | 99.8 | — | 70.0 | — | — | 10.0 | 20.0 | 20.0 |
| Hydrocarbon Resin[1] | — | — | 29.55 | 30.0 | 22.55 | 22.55 | 22.55 | 29.55 |
| Antioxidant[2] | 0.2 | 0.2 | 0.10 | 0.10 | 0.10 | 0.10 | 0.10 | 0.10 |
| Antioxidant[3] | — | — | 0.35 | 0.35 | 0.35 | 0.35 | 0.35 | 0.35 |
| % Styrene in Blend | 28 | 0 | 10 | 0 | 0 | 5.4 | 10.8 | 10.8 |
| % Styrene in Styrenated Amorphous | 28 | — | 15 | — | — | 54 | 54 | 54 |
| Piccotex LC[4] | — | — | — | — | 7.5 | — | — | — |
| Properties | | | | | | | | |
| Ring and Ball Softening Point, ° C. | 110 | 107 | — | 96 | 94 | 98 | 100 | 100 |
| Viscosity (Thermosel) 350° F., cp. | — | 3850 | 2400 | 2250 | 1500 | 1900 | 2200 | 2400 |
| Viscosity (Thermosel) 190° C., cp. | 5200 | — | — | — | — | | | |
| Room Temperature Peel Strength, g. | | | | | | | | |
| Paper/Paper | 560 | 580 | 1260 | 1123 | — | | | |
| Polyethylene Film/Polyethylene Film | — | — | — | — | 960 | 1090 | 1020 | 1250 |
| Color | White | 4* | White | 4* | 3* | White | White | White |

*Gardner Scale
[4]alpha methyl styrene/vinyl toluene resin having a ring and ball softening point of 90° C. (Hercules, Inc.).

The compositions of this invention are useful are hot melt adhesives. Due to their white color, they are more aesthetically pleasing than prior amorphous polyolefin based adhesives, particularly when used on consumer products such as disposable diapers.

The invention has been described in detail with particular reference to preferred embodiments thereof, but it will be understood that variations and modifications can be effected within the spirit and scope of the invention.

We claim:

1. An adhesive composition capable of being used as a hot melt adhesive comprising a blend of styrenated amorphous polyolefin having a styrene content of about 1 to 90 percent by weight and a melt viscosity at 190° C. of at least 10 centipoise prepared by polymerizing styrene in the presence of an amorphous polyolefin having a melt viscosity at 190° C. of from about 100 to about 500,000 centipoise with a peroxide catalyst at a temperature of about 160° C. to about 300° C. and about 10 to 50 weight percent of the adhesive composition of at least one tackifying resin selected from the group consisting of hydrocarbon resins, polyterpene resins and rosin esters.

2. An adhesive composition according to claim 1 wherein said styrenated amorphous polyolefin is a member of the group consisting of (1) styrenated amorphous polypropylene or (2) styrenated amorphous propylene-alpha-monoolefin copolymer, or mixtures of (1) and (2).

3. An adhesive composition according to claim 1 wherein said tackifying resin is hydrocarbon resin.

4. An adhesive composition capable of being used as a hot melt adhesive comprising a blend of 90 to 50 percent by weight of a mixture of (1) 5 to 90 percent by weight styrenated amorphous polyolefin having a styrene content of about 1 to 90 percent by weight prepared by polymerizing styrene in the presence of an amorphous polyolefin having a melt viscosity at 190° C. of from about 100 to about 500,000 centipoise with a peroxide catalyst at a temperature of about 160° C. to about 300° C., (2) 5 to 85 percent by weight essentially noncrystalline hexane soluble polyolefin having a melt viscosity at 190° C. of about 100 to about 500,000 centipoise and 10 to 50 percent by weight of at least one tackifying resin selected from the group consisting of hydrocarbon resins, polyterpene resins and rosin esters.

5. An adhesive composition according to claim 4 wherein said styrenated amorphous polyolefin is a member of the group consisting of (1) styrenated amorphous polypropylene or (2) styrenated amorphous propylene-alpha-monoolefinic copolymer, or mixtures of (1) and )2).

6. An adhesive composition according to claim 5 wherein said amorphous polyolefin is a member of the group consisting of (1) amorphous polypropylene, or (2) amorphous propylene-alpha-monoolefinic copolymer, or mixtures of (1) and (2).

7. An adhesive composition according to claim 6 wherein said tackifying resin is hydrocarbon resin.

8. An adhesive composition capable of being used as a hot melt adhesive comprising a blend of (1) 10 to 20 percent by weight styrenated amorphous polyolefin containing 30 to 70 weight percent styrene prepared by polymerizing styrene in the presence of an amorphous polyolefin having a melt viscosity at 190° C. of from about 100 to about 500,000 centipoise with a peroxide catalyst at a temperature of about 160° C. to about 300° C., (2) 50 to 70 weight percent amorphous polyolefin, and (3) 20 to 30 weight percent hydrocarbon tackifying resin.

9. An adhesive composition according to Claim 8 wherein said styrenated amorphous polyolefin is styrenated amorphous polypropylene.

10. An adhesive composition according to claim 9 wherein said amorphous polyolefin is amorphous polypropylene.

11. An adhesive composition according to claim 10 wherein said hydrocarbon tackifying resin is DAC-B hydrocarbon resin.

* * * * *